US009800744B2

(12) United States Patent
Grewal et al.

(10) Patent No.: US 9,800,744 B2
(45) Date of Patent: Oct. 24, 2017

(54) SYSTEMS AND METHODS FOR LABEL CREATION USING OBJECT RECOGNITION (71) Applicants: Ardaman S. Grewal, Brookfield, WI (US); Marlon O. Davis, Waukesha, WI (US)

(72) Inventors: Ardaman S. Grewal, Brookfield, WI (US); Marlon O. Davis, Waukesha, WI (US)

(73) Assignee: Brady Worldwide, Inc., Milwaukee, WI (US)

(*) Notice: Subject to any disclaimer, the term of this patent is extended or adjusted under 35 U.S.C. 154(b) by 112 days.

(21) Appl. No.: 13/762,100

(22) Filed: Feb. 7, 2013

(65) Prior Publication Data

US 2013/0208131 A1 Aug. 15, 2013

Related U.S. Application Data (60) Provisional application No. 61/596,999, filed on Feb. 9, 2012.

(51) Int. Cl.
*H04N 1/00* (2006.01)
*B41J 3/407* (2006.01)
*B41J 3/46* (2006.01)

(52) U.S. Cl.
CPC ........ *H04N 1/00278* (2013.01); *B41J 3/4075* (2013.01); *B41J 3/46* (2013.01)

(58) Field of Classification Search
CPC ......... B41J 3/4075; B41J 3/46; G06F 3/0488; G06F 17/212

(Continued)

(56) References Cited

U.S. PATENT DOCUMENTS

| 4,817,166 A | 3/1989 | Gonzalez et al. |
| 5,399,030 A | 3/1995 | Niwa et al. |

(Continued)

FOREIGN PATENT DOCUMENTS

| CN | 1598860 A | 3/2005 |
| CN | 101615247 A | 12/2009 |

(Continued)

OTHER PUBLICATIONS

English Abstract of JP 2003104554. Patent Abstracts of Japan, Apr. 9, 2003.

*Primary Examiner* — Twyler Haskins
*Assistant Examiner* — Carramah J Quiett
(74) *Attorney, Agent, or Firm* — Quarles & Brady LLP (57) ABSTRACT Systems and methods create labels and include a mobile device including communication circuitry, an imaging device, an object recognition application, and a label creation application. A label printer includes printer memory and printer communication circuitry. The object recognition application is configured to analyze an image of a device taken by the imaging device and generate device data for the device in the image. The label creation application the uses the device data to automatically populate at least a portion of a label data entry screen. Once the label data entry screen is populated, the label creation application creates a print job and, via the mobile device communication circuitry, communicate the print job to the label printer to print at least one label sized specifically for the device.

20 Claims, 4 Drawing Sheets (58) Field of Classification Search
USPC .............................. 348/207.99–207.2, 211.8
See application file for complete search history.

(56) References Cited

U.S. PATENT DOCUMENTS

| | | | |
|---|---|---|---|
| 5,835,136 A | 11/1998 | Watanabe et al. | |
| 6,064,492 A | 5/2000 | Eldridge et al. | |
| 6,405,055 B1 | 6/2002 | Silverbrook et al. | |
| 7,385,713 B2 | 6/2008 | Silverbrook et al. | |
| 7,430,067 B2 | 9/2008 | Silverbrook | |
| 7,770,995 B2 | 8/2010 | Silverbrook | |
| 7,991,432 B2 | 8/2011 | Silverbrook et al. | |
| 8,009,333 B2 | 8/2011 | Silverbrook | |
| 8,605,189 B2* | 12/2013 | Fan | G06K 9/2081 348/135 |
| 2005/0002715 A1* | 1/2005 | Fries et al. | 400/88 |
| 2005/0200637 A1* | 9/2005 | Silverbrook et al. | 347/2 |
| 2006/0002607 A1* | 1/2006 | Boncyk | G06F 17/30247 382/165 |
| 2006/0180737 A1 | 8/2006 | Consiglio | |
| 2006/0203028 A1 | 9/2006 | Agarwal et al. | |
| 2007/0024723 A1 | 2/2007 | Ichimasa et al. | |
| 2007/0103566 A1 | 5/2007 | Aerrabotu et al. | |
| 2010/0210135 A1* | 8/2010 | German | H04Q 1/138 439/491 |
| 2011/0212717 A1 | 9/2011 | Rhoads et al. | |
| 2011/0216158 A1 | 9/2011 | Bigioi et al. | |
| 2013/0293734 A1* | 11/2013 | Fan | G06K 9/2081 348/222.1 |

FOREIGN PATENT DOCUMENTS

| | | |
|---|---|---|
| CN | 201456574 U | 5/2010 |
| EP | 0961220 A2 | 12/1999 |
| JP | 2003104554 A | 4/2003 |
| JP | 2007068149 A | 3/2007 |
| JP | 2008030347 A | 2/2008 |
| JP | 2010240844 A | 10/2010 |
| KR | 1020110121478 | 7/2011 |

* cited by examiner

SYSTEMS AND METHODS FOR LABEL CREATION USING OBJECT RECOGNITION

CROSS-REFERENCE TO RELATED APPLICATIONS

This application claims the benefit of U.S. Provisional Patent Application Ser. No. 61/596,999, filed Feb. 9, 2012, and entitled "SYSTEMS AND METHODS FOR LABEL CREATION USING OBJECT RECOGNITION," which is hereby incorporated by reference.

STATEMENT REGARDING FEDERALLY SPONSORED RESEARCH OR DEVELOPMENT

Not applicable.

BACKGROUND OF THE INVENTION

The subject matter disclosed herein relates generally to systems and methods for creating printed information for a device, and, more particularly, to systems and methods that create labels using data obtained through object recognition of the device.

Labels are used in most, if not all, aspects of our lives. They come in many different shapes, sizes, colors and materials, and are created and applied to or coupled to most any device for most any purpose. For example, labels can be used to provide identification of a device, to provide instructions, warnings, and specific information about the device.

Labels can be generated manually, i.e., writing information on a label and applying it to a device, or, a label generation and printing system may be used. Generally, for label generation and printing systems, the label size and type must first be determined for the device to receive the label, and, once determined, is then manually entered into a label creation software program on a computer or other electronic device. Then the information intended to be displayed on the label is manually entered, edited as needed, and the software is instructed to print the label to a label printer configured to print the specified label.

In numerous applications, labels provide a critical role in identifying a large number of related or connected devices. For example, in the telecommunications industry, labels are used on patch panels to not only identify individual patch panels, but also in the identification of the large number of circuits in the patch panel and in the telecommunications system. The patch panel can include any number of ports, which are usually of the same or similar type, and the ports are typically arranged on blocks. Each port and/or block are then individually and uniquely labeled to identify the specific circuit that the port is being used for. Labeling schemes such as this helps to assist a user when viewing the patch panel and trying to understand the circuit configuration for modifications and/or repairs, for example.

In order to create the labels used on a patch panel, a user has to know specific details about the patch panel, such as the number of ports, the physical size and spacing of the ports, the number of blocks on the patch panel, and possibly procedural information. When the patch panel is to be labeled in the field, which is common, these specific details are not always readily available. The user is required, at a minimum, to physically measure the ports so as to determine the correct size and spacing for the labels that will be used to uniquely identify each port. In a crowded closet containing many patch panels and associated wires, taking measurements may not be a convenient option. Using incorrect values leads to wrong label dimensions, wasted labels, and a less than desirable user experience.

Therefore, a need exists to minimize or eliminate manual data gathering to determine the specific details about a device to avoid gathering incorrect information and to reduce or eliminate the drawbacks of generating labels or other device related information based on the incorrect information.

It would, therefore, be desirable to provide systems and methods where a user uses a mobile device equipped with an imaging device and object recognition capabilities to automatically generate spatial data for a device in an image, and then automatically populate label creation software with the generated data.

BRIEF DESCRIPTION OF THE INVENTION

The present embodiments overcomes the aforementioned problems by providing systems and methods that acquire spatial data of a device from an image of the device in order to create and print device related information, including one or more specifically configured labels for the device. The label creation system includes a mobile device enabled with a label creation application, an imaging device, an object recognition application, and a printer to print labels. The label creation system allows a user to create and print one or more labels using the hand-held mobile device, wirelessly connected to the label printer, where the mobile device takes an image of the device, and using object recognition, provides relevant device information, including providing spatial device data to the label creation application so the user does not need to manually determine the data, and automatically populates a data entry screen necessary to create the label(s) sized for the device.

Accordingly, in some embodiments, a label creation system includes a mobile device, the mobile device including communication circuitry, an imaging device, an object recognition application, and a label creation application. A label printer includes printer memory and printer communication circuitry, the printer communication circuitry capable of communication with the mobile device communication circuitry. The object recognition application is configured to analyze an image of a device acquired by the imaging device and generate device data for the device in the image, the device data being usable by the label creation application to automatically populate a label data entry screen. Once the label data entry screen is populated, the label creation application is configured to create a print job and, via the mobile device communication circuitry, communicate the print job to the label printer to print at least one label sized specifically for the device.

In other embodiments, a label creation system includes a mobile software application configured to operate on a mobile device, the mobile device including an imaging device, the mobile software application including an object recognition application, and a label creation application, the mobile software application configured to communicate with a label printer. The object recognition application is configured to analyze an image of a device acquired by the imaging device and generate device data for the device in the image, the device data being usable by the label creation application to automatically populate at least a portion of a label data entry screen. Once the label data entry screen has been populated, the label creation application is configured to create a print job and, via the mobile software application, communicate the print job to the label printer to print at least one label sized specifically for the device.

Yet in other embodiments, a method for creating a label includes the steps of launching a label creation application on a mobile device; using the mobile device, acquiring an image of a device; analyzing the image using object recognition; generating device data for the device in the image; automatically populating at least a portion of a label data entry screen in the label creation application with the generated device data; and creating a label using the generated device data, the label being sized specifically for the device.

To the accomplishment of the foregoing and related ends, the embodiments, then, comprise the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

The embodiments will hereafter be described with reference to the accompanying drawings, wherein like reference numerals denote like elements, and.

DETAILED DESCRIPTION OF THE INVENTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures. The figures depict selected embodiments and are not intended to limit the scope of embodiments of the invention. Skilled artisans will recognize the examples provided herein have many useful alternatives and fall within the scope of embodiments of the invention.

The following description refers to elements or features being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically, such as when elements or features are embodied in program code. Thus, although schematics shown in the figures depict example arrangements of processing elements, additional intervening elements, devices, features, components, or code may be present in an actual embodiment.

The invention may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, diodes, look-up tables, etc., which may carry out a variety of functions under the control of one or more microprocessors or other control devices. Other embodiments may employ program code, or code in combination with other circuit components.

In accordance with the practices of persons skilled in the art of computer programming, the present disclosure may be described herein with reference to symbolic representations of operations that may be performed by various computing components, modules, or devices. Such operations may be referred to as being computer-executed, computerized, software-implemented, or computer-implemented. It will be appreciated that operations that can be symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

Figure 1:
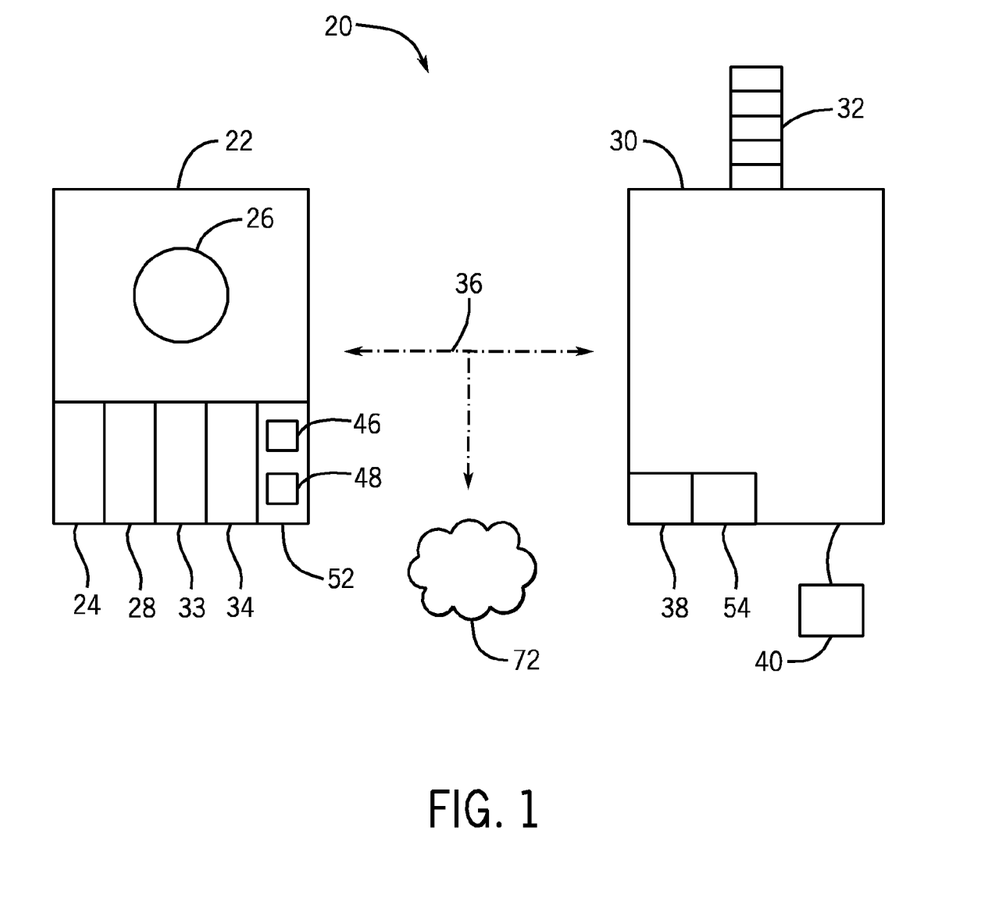
FIG. 1 is a block diagram view showing a label creation system according to an embodiment of the invention.

Referring now to the drawings wherein like reference numbers correspond to similar components throughout the several views and, specifically, referring now to FIG. 1, embodiments of the invention shall be described in the context of a label creation system 20. The label creation system 20 comprises systems and methods for acquiring spatial data of a device from an image of the device in order to create and print one or more specifically configured labels for the device. In the embodiment shown in FIG. 1, the label creation system 20 may include a mobile device 22 and a printer 30 to print labels 32. The mobile device 22 may be enabled with a label creation application 24, an imaging device 26, and an object recognition application 28. The imaging device 26 may comprise a camera or other known optical sensors.

A variety of mobile devices 22 are envisioned for use with the label creation system 20. For example, a typical mobile device 22 may comprise a cell phone, a media player, a tablet, a camera, a printer, and/or a laptop computer. The mobile device 22 may include device communication circuitry 33 to communicate wirelessly or wired with the printer 30 to print the one or more labels 32.

The mobile device 22 may include a processor running an operating system 34 such as the Android operating system or the Apple (iOS) operating system or Windows Mobile operating system, as non-limiting examples. It is to be appreciated that additional currently known or future developed operating systems for mobile devices (i.e., smart devices) are contemplated and fall within the scope of the invention.

Similarly, wireless communication 36 may include a variety of known or future developed communication protocols. For example, wireless communication 36 may comprise Bluetooth, Wi-Fi, ZigBee, and many other known wireless protocols and frequencies, as non-limiting examples. Most mobile devices are capable of multiple forms of wireless communications.

Printer 30 may comprise any printer configured to wirelessly or via wire communicate with a mobile device 22. For example, printer 30 is shown including printer wireless communication circuitry 38 capable of Bluetooth communication, for example, to allow wireless communication with a mobile device also configured for Bluetooth communication. Printer 30 is also shown coupled to a wireless communication bridge 40, for example. The bridge 40 may comprise a wireless Ethernet bridge to allow for wireless communication with a mobile device configured for wireless Ethernet communication.

The mobile device 22 includes the mobile label creation application 24 and the object recognition application 28. It is to be appreciated that the label creation application 24 and the object recognition application 28 may be the same application or may be separate applications. Users of the label creation system 20 use the imaging device 26 and object recognition application 28 on the mobile device 22 to acquire one or more images 42 of a device 44 in need of one or more labels (see FIG. 2). In this context, device is used broadly and is meant to encompass any object having a shape and size that may be considered for the generation of device related information, including for example, the generation and application of a label specific to the device. The object recognition application 28 analyzes the image 42, or an image file 46, and generates spatial device data 48 of the device 44 in the image 42.

Figure 2:
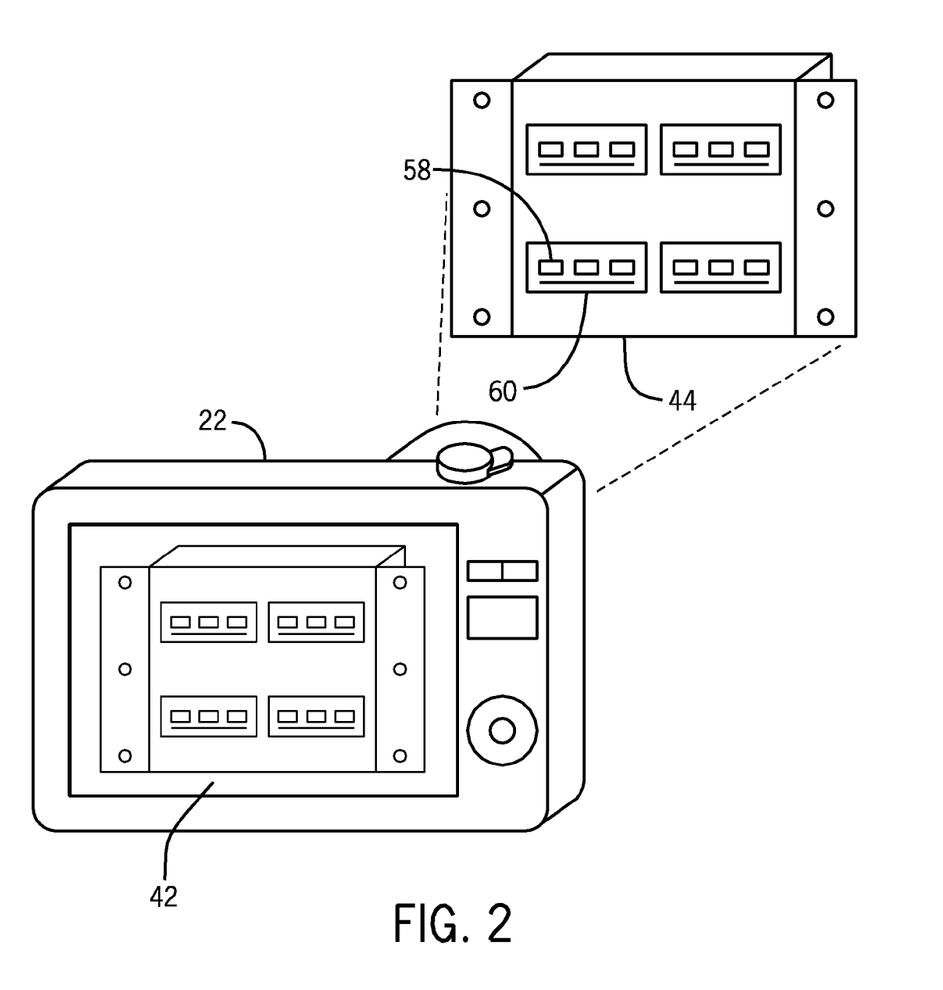
FIG. 2 is a perspective view of a mobile device acquiring an image of a device in need of one or more specifically sized labels, according to an embodiment of the invention.

Once the image 42 is acquired, the image file 46 may be created and stored in the mobile device memory 52 and/or the printer memory 54 and/or at the web based home office 72 for later access by the object recognition application 28. Using a patch panel as a non-limiting example of the device 44, once the image file 46 is analyzed by the object recognition application 28, the application 28 can be used to generate the spatial device data 48, which may include the number of ports 58 and blocks 60, the physical size and spacing of the ports, and identify the orientation of the ports, as non-limiting examples.

Though described with respect to a patch panel typically used in the telecommunications industry, one of ordinary skill in the art can extend the concepts disclosed herein to most any other application where information about a device is desired. In one application, a device may be in need of one or more labels, where the invention allows a label to be created that may then be placed on or coupled to the device. Other applications may allow the generation and printing of device instructions or other procedural information about the device, for example.

The object recognition application 28 may use one or more of a variety of known or future developed object recognition techniques. Some well known techniques include, but are not limited to, edge detection, corner detection, interest point detection, template matching, grayscale matching, and feature detection.

Figure 3:
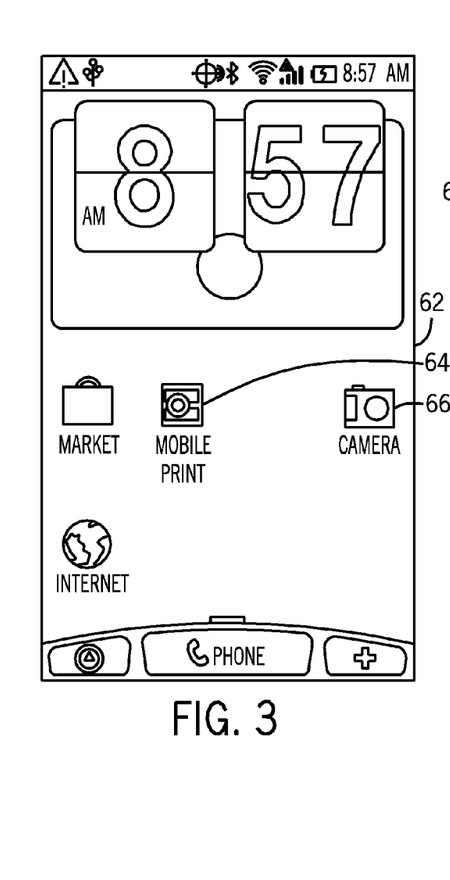
FIG. 3 is a view of a user interface home screen on a mobile device, usable to launch a label creation application, according to an embodiment of the invention.

Once the object recognition application 28 has competed its analysis and generated device data 48 based on the image of the device 44, the device data 48 may then be applied to the label creation application 24. FIG. 3 shows an example of a user interface home screen 62 viewable on a mobile device 22 that the user may use to launch the label creation application 24. The home screen 62 may include a button or icon 64 for the label creation application 24. In some embodiments, the home screen 64 may also include a button or icon 66 to launch the object recognition application 28.

Figure 4:
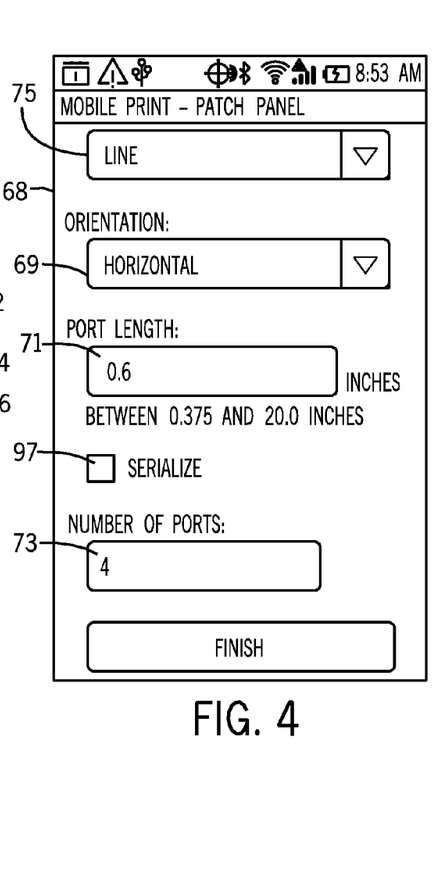
FIG. 4 is a view of a patch panel data entry screen on a mobile device, usable to manually or automatically enter patch panel label data, according to an embodiment of the invention.

The label creation application 24 can be configured according to one or more typical label configurations. Examples of label configurations include, but are not limited to, flags, wiremarker, patch panel, terminal block, "66 block," "110 block," BIX block, fixed label, labels used in medical laboratories, and general ID labels. FIG. 4 shows an example of a patch panel data entry screen 68 of the label creation application 24 that can be used to manually or automatically enter data to create labels specific to a patch panel 44.

The label creation system 20 allows a user to create and print one or more labels using the hand-held mobile device 22, wirelessly connected to the label printer 30, where the mobile device 22 takes an image 42 of the device 44, and using object recognition, provides relevant spatial device data 48 to the label creation application 24 so the user does not need to manually determine the data, although manually determining device data is still possible. The label creation application 24 may then automatically populate the screen 68 necessary to create the label(s) for the device 44. Manual data entry may also be possible. As can be seen, exemplary data fields include Line 75, Orientation 69, Port Length 71, and Number of Ports 73.

Figure 5:
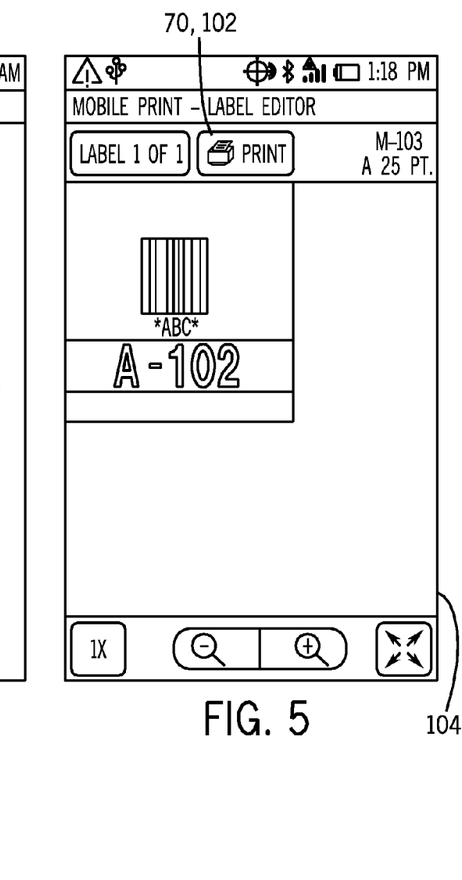
FIG. 5 is a view of a user interface screen on a mobile device, usable to edit a label and invoke a print command, according to an embodiment of the invention.

Once the user has used the label creation application 24 to configure the desired label(s) 32, the user may invoke a print command 70 (see FIG. 5) using the mobile device 22 to generate the label(s) at the printer 30. The label creation application 24 may include the ability to search for available printers, and more specifically, to search for available printers that have specific features, such as having a specific size, shape, or color available and/or label supply installed, for example. In some embodiments, the label creation application 24 wirelessly communicates 36 with any printer having the same wireless communication capabilities as the mobile device 22, and that is supported by the label creation application 24. The communication capabilities may be removable and replaceable with the use of a network card, such as communication circuitry 38, to support a variety of wireless communication options. The label creation application 24 may also be configured to wirelessly access a web based home office 72, for example, to acquire additional data, such as template files, label data and printer data, and/or to store images 42 and image files 46 to be retrieved and used later.

Figure 6:
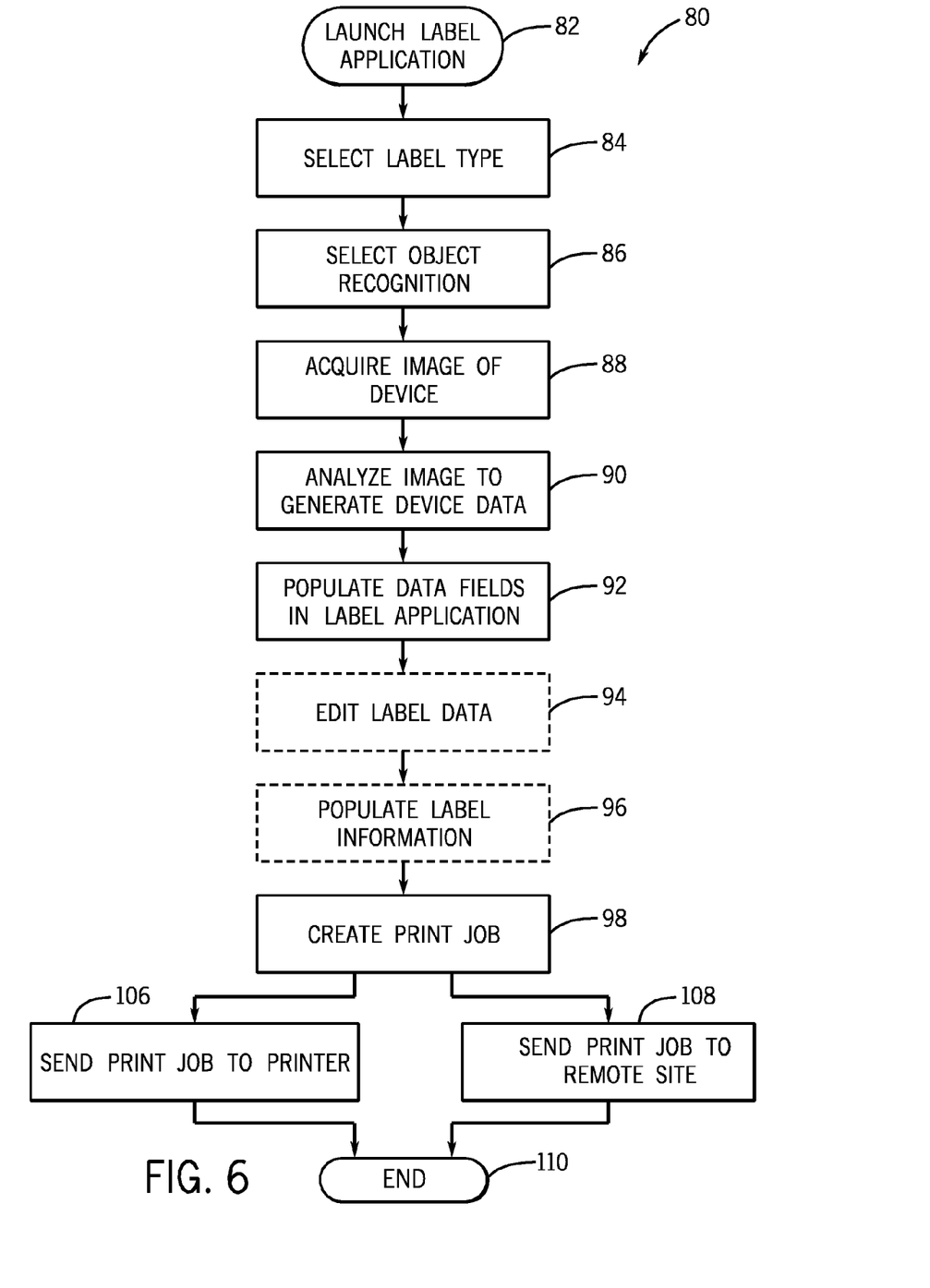
FIG. 6 is a flow chart illustrating a method that may be performed in accordance with embodiments of the block diagram illustrated in FIG. 1.

Referring now to FIG. 6, a method 80 is illustrated that is consistent with embodiments of the label creation system 20 shown in FIG. 1. At process block 82, the user launches the label creation application 24 on the mobile device 22. As previously described, FIG. 3 shows an example of a user interface home screen 62 viewable on a mobile device 22 that the user may use to launch the label creation application 24.

One of the first workflow steps in creating a label is to determine a label type, including label dimensions and desired layout. Accordingly, at process block 84, the user selects the type of label they would like to use for their particular application. In the exemplary embodiment described herein, the user can select patch panel labels.

Once the label type is selected, at process block 86, the user can then launch the object recognition application 28.

In some embodiments, the object recognition application 28 may be launched automatically when the label creation application 24 is launched. With the imaging device 26 enabled on the mobile device 22, one or more images 42 may be taken of all or a portion of the device 44. At process block 88, the user points the imaging device 26 at the device 44 and may be presented with a real-time video image preview (see FIG. 2). The user may choose to adjust the imaging device distance from the device until a clear and appropriately sized image is previewed. Once the image preview is satisfactory, the user takes one or more images of the device 44, and the imaging device 26 captures the image 42.

With the image 42 captured and image file 46 saved, at process block 90, the object recognition application 28 analyzes the image file 46 to generate device data 48. In the exemplary embodiment where the device 44 comprises a patch panel, device data 48 is generated for the patch panel 44 in the image, which may include the number of ports 58 and blocks 60, the physical size and spacing of the ports, and identify the orientation of the ports, as non-limiting examples. Although not shown, it is contemplated that an object recognition application generated image may also be presented and/or available to the user that identifies results from the object recognition application 28, including for example, an image of the patch panel including lines showing outlines of ports 58 and blocks 60 identified using object recognition.

Next, at process block 92, the generated device data 48 may then be automatically populated into the patch panel data entry screen (see FIG. 4) for the creation of labels for the patch panel. Without the use of the object recognition application 28, the user would need to determine the appropriate values and then manually enter the values into the patch panel data entry screen 68. Optionally, at process block 94, the user may edit the automatically populated data.

Again, optionally, at process block 96, the user may then enter information to be printed on the labels. This information may be entered manually, using a counter for sequential data, or from some other data source, such as a stored data file, as non-limiting examples.

As described for process blocks 94 and 96, the user may input and/or edit the label data and further design the label graphically, in real time, on the mobile device 22, using a touch screen, and/or a display screen and/or a keyboard or stylus, for example.

In some applications, text or data that a user may want on a label(s) may already be available in a data file, such as in a spreadsheet or comma separated values (CSV) text file. Instead of manually entering the text or data on the mobile device to be used with the label, the user can import available data for use on the label design and create labels based on the imported data. The label creation application 24 may utilize data from the data file, and merge it with the label design to generate a label(s) for each data field in the data file. The data file may be stored remotely or in the mobile device memory 52 and/or printer memory 54.

In other embodiments, the data to be placed on multiple labels may be sequential, which is common in electrical and telecommunication applications. For example, an application requires the user to create labels to identify ten wires. The pattern for identification of these wires is A-01, A-02, through A-10. Instead of the user entering in this text on each label, the label creation application 24 may allow the user to specify "Serialize" 97 (see FIG. 4) from, for example, A-01 to A-10, and the label creation application 24 automatically generates the labels with this data. This is an extremely useful feature when many labels include sequential label data.

Once the user is satisfied with the type and/or quantity of label data 48, at process block 98, the print command 70 may be invoked, and the label data from screen 68 is rendered as a print job. The user may invoke the print command 70 via icon 102. The print icon 102 may be available, for example, on a label editor screen 104 (see FIG. 5).

At process block 106, the print job is sent to the printer 30 over the wireless connection 36, allowing the printer to consume the print data and to print the desired label(s). In an alternative embodiment, at process block 108, the user may save the generated labels to memory 52 or 54, or to the web based home office 72, for example, to be retrieved and used later. The process may end at process block 110, or optionally, the process may be repeated to create additional labels.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this invention.

We claim:

1. A label creation system, the system comprising:
   a mobile device, the mobile device including communication circuitry, an imaging device, an object recognition application, and a label creation application;
   a label printer, the label printer including printer memory and printer communication circuitry, the printer communication circuitry capable of communication with the mobile device communication circuitry;
   the object recognition application configured to analyze an image of a physical device acquired by the imaging device and generate device data for the physical device in the image, the device data being usable by the label creation application to automatically populate a label data entry screen; and
   once the label data entry screen is populated, the label creation application is configured to create a print job and, via the mobile device communication circuitry, communicate the print job to the label printer to print at least one label sized specifically for the physical device.

2. The system according to claim 1, wherein the mobile device includes mobile device memory, the mobile device memory configured to store at least one of the image of the physical device and the device data.

3. The system according to claim 1, wherein the device data comprises spatial data specific to the physical device.

4. The system according to claim 1, wherein once the image is acquired, an image file is created and stored in a memory for later access by the object recognition application.

5. The system according to claim 1, wherein the device data is used to generate device information, the device information comprising at least one of device instructions and device procedural information.

6. The system according to claim 1, wherein the mobile device comprises at least one of a cell phone, a tablet, a media player, an imaging device, a printer, and a laptop.

7. The system according to claim 1, wherein the mobile device is configured to wirelessly search for an available label printer that has a predefined label type.

8. The system according to claim 1, wherein the mobile device wirelessly transmits the print job to the label printer using at least one of Bluetooth or Wi-Fi communication.

9. A label creating system, the system comprising:
a mobile software application configured to operate on a mobile device, the mobile device including an imaging device, the mobile software application including an object recognition application, and a label creation application, the mobile software application configured to communicate with a label printer;
the object recognition application configured to analyze an image of a physical device acquired by the imaging device and generate device data for the physical device in the image, the device data being usable by the label creation application to automatically populate at least a portion of a label data entry screen; and
once the label data entry screen has been populated, the label creation application is configured to create a print job and, via the mobile software application, communicate the print job to the label printer to print at least one label sized specifically for the physical device.

10. The system according to claim 9, wherein the physical device is a patch panel.

11. The system according to claim 10, wherein the object recognition application generates spatial data comprising a physical size and spacing of at least one port on the patch panel.

12. A method for creating a label, the method comprising:
launching a label creation application on a mobile device;
using the mobile device, acquiring an image of a physical device;
analyzing the image using object recognition;
generating device data for the physical device in the image;
automatically populating at least a portion of a label data entry screen in the label creation application with the generated device data; and
creating a label using the generated device data, the label being sized specifically for the physical device.

13. The method according to claim 12, wherein creating a label further includes creating a print job including the generated device data;
sending the print job to a label printer; and
printing the label from the print job that is sized specifically for the physical device.

14. The method according to claim 12, further including launching an object recognition application.

15. The method according to claim 12, further including automatically launching an object recognition application when the label creation application is launched.

16. The method according to claim 15, wherein the label creation application includes the object recognition application.

17. The method according to claim 12, further including selecting a label type.

18. The method according to claim 17, further including configuring a label editor on the mobile device based on the selected label type; and
using the configured label editor, editing the selected label type on the mobile device for creating a print job.

19. The method according to claim 17, further including wirelessly searching for available label printers that are capable of wireless communication with the mobile device.

20. The method according to claim 19, further including wirelessly searching for at least one available label printer that is capable of wireless communication with the mobile device and that has the selected label type.

* * * * *